United States Patent
Mindermann et al.

(10) Patent No.: US 7,694,915 B2
(45) Date of Patent: Apr. 13, 2010

(54) COVERING DEVICE FOR A HINGE OF AN AIRCRAFT

(75) Inventors: Marco Mindermann, Verden-Walle (DE); Thomas Schwill, Delmenhorst (DE)

(73) Assignee: Airbus Deutschland GmbH (DE)

(*) Notice: Subject to any disclaimer, the term of this patent is extended or adjusted under 35 U.S.C. 154(b) by 170 days.

(21) Appl. No.: 11/572,304

(22) PCT Filed: Jul. 19, 2005

(86) PCT No.: PCT/EP2005/007874

§ 371 (c)(1),
(2), (4) Date: Jan. 18, 2007

(87) PCT Pub. No.: WO2006/008144

PCT Pub. Date: Jan. 26, 2006

(65) Prior Publication Data

US 2007/0257151 A1    Nov. 8, 2007

Related U.S. Application Data

(60) Provisional application No. 60/589,284, filed on Jul. 19, 2004.

(30) Foreign Application Priority Data

Jul. 19, 2004  (DE) .................. 10 2004 034 903

(51) Int. Cl.
*B64C 1/38* (2006.01)

(52) U.S. Cl. ................................... 244/130

(58) Field of Classification Search ................. 244/130, 244/131, 129.5; 16/250, 251; 49/383, 384
See application file for complete search history.

(56) References Cited

U.S. PATENT DOCUMENTS

| 2,368,702 A | * | 2/1945 | Bourne ................ 244/130 |
| 3,302,690 A | * | 2/1967 | Hurd .................... 160/40 |
| 4,634,172 A | | 1/1987 | Duda ................... 296/163 |
| 5,630,459 A | | 5/1997 | Martin ................. 160/236 |
| 5,716,158 A | | 2/1998 | Hahn et al. .......... 403/291 |
| 5,941,480 A | | 8/1999 | Wille .................. 244/131 |
| 5,950,368 A | | 9/1999 | Bradford ............... 52/20 |
| 6,145,165 A | | 11/2000 | Torcato ................ 16/355 |

(Continued)

FOREIGN PATENT DOCUMENTS

CA    2 143 627    8/1993

(Continued)

OTHER PUBLICATIONS

International Search Report PCT/EP2005/007874 dated Oct. 14, 2005 (European Patent Office NL).

*Primary Examiner*—Michael R Mansen
*Assistant Examiner*—Michael Kreiner
(74) *Attorney, Agent, or Firm*—Ostrolenk Faber LLP

(57) ABSTRACT

Hinges, in particular in doors of aircraft, have poor aerodynamics. According to one embodiment of the present invention, a covering device for a hinge of an aircraft is provided with a flexible covering, which for example is stretched, with a closed hinge, over the outer contour of the hinge. Advantageously, this makes possibly the covering of openings between first and second hinge parts, whereby an improved aerodynamic can be achieved.

11 Claims, 5 Drawing Sheets

U.S. PATENT DOCUMENTS

| | | | |
|---|---|---|---|
| 6,276,026 B1 | 8/2001 | Wille | 16/250 |
| 6,354,651 B1 | 3/2002 | Mori | 296/146.1 |
| 6,877,695 B2 * | 4/2005 | Eveker et al. | 244/129.5 |
| 2003/0178269 A1 | 9/2003 | Hayashi et al. | 188/321.11 |
| 2003/0205001 A1 | 11/2003 | Williams et al. | 49/383 |

FOREIGN PATENT DOCUMENTS

| | | |
|---|---|---|
| CA | 2 319 332 | 8/1999 |
| DE | 69102043 T2 | 9/1994 |
| DE | 19935200 | 2/2001 |
| JP | 58012824 | 1/1983 |
| JP | 1193464 | 8/1989 |
| JP | 2003557 | 1/1990 |
| JP | 7048963 | 2/1995 |
| JP | 7243288 | 9/1995 |
| JP | 9099739 | 4/1997 |
| JP | 2000-039252 | 2/2000 |
| JP | 2000-168630 | 6/2000 |
| JP | 2000-295740 | 10/2000 |
| JP | 2001-090440 | 4/2001 |
| JP | 2001121962 | 5/2001 |
| WO | WO 01/09474 | 2/2001 |
| WO | WO 03/097253 | 11/2003 |

* cited by examiner

COVERING DEVICE FOR A HINGE OF AN AIRCRAFT

CROSS REFERENCE TO RELATED APPLICATION

The present application is a 35 U.S.C. §§371 national phase conversion of PCT/EP2005/007874, filed 19 Jul. 2005, which claims the benefit of the filing date of U.S. Provisional Patent Application No. 60/589,284 filed Jul. 19, 2004 and of German Patent Application No 10 2004 034 903.7 filed Jul. 19, 2004, the disclosures of which are herein incorporated by reference. The PCT Application was published in the English Language.

BACKGROUND OF THE INVENTION

The present invention relates to a covering for a hinge, such as, for example a hinge of an aircraft door. In particular, the present invention relates to a covering device for an aircraft hinge as well as a hinge for a door of an aircraft.

In aircraft construction, for protection of a hinge against rainwater impinging the body and door in the outer region of the aircraft, aluminum profiles are riveted on both sides parallel to the hinge of the door. These aluminum profiles conduct away rainwater on the hinge. In particular, such devices are used for cargo doors of cargo aircrafts.

In a disadvantageous manner, the externally riveted aluminum profiles produce air resistance, which upon use in an aircraft, can result in additional fuel consumption, and therewith, an increased flight weight.

In addition, in aircraft construction, a film applied under the hinge within the aircraft is known, which is attached to the door as well as the body and conducts penetrating rainwater laterally on the door.

In a disadvantageous manner, with these solutions, a gap remains between the door and the shell of the aircraft body, which can produce turbulence, which likewise is a disadvantageous for fuel consumption of the aircraft and can effect the flight weight of the aircraft.

SUMMARY OF THE INVENTION

It is an object of the present invention to provide an aerodynamically improved hinge element.

According to one embodiment of the present invention, as provided in claim 1, a covering device for a hinge for an aircraft is provided, wherein the hinge has an outer contour, a first hinge part, and a second hinge part. The first hinge part is displaceable relative to the second hinge part between a first position and a second position. The covering device includes a flexible covering, which has a first region and a second region. The first region is mountable on the first hinge part and the second region is mountable on the second hinge part. In an unstretched state, the flexible covering has a first dimension between the first and the second region. When the first region is mounted on the first hinge part and the second region is mounted on the second hinge part and the hinge is in the first position, for example, in the closed position, in which with use in an aircraft, the door of the aircraft is closed, a second dimension between the first region and the second region is greater than the first dimension, wherein the flexible covering, for example, is stretched upon closing of the hinge over a region of the outer contour of the hinge.

In an advantageous manner it is effected that the covering rests firmly on the hinge or the hinge housing, because, upon closing of the hinge, the flexible covering stretches over the outer contour of the hinge or for example, of the hinge axis casing. Advantageously, in this manner, the flexible covering is subject only to a very small deformation from the effect of external forces, since the flexible covering rests firmly on the outer contour of the hinge.

In an advantageous manner, openings, which are provided between the first and second hinge part by the connection of both hinge parts via a hinge axis, are closed from the outside by the flexible covering and thereby protected against external effects.

As described previously, the previously known hinges have an aerodynamic resistance, which arise from air turbulence, which develop on the outer openings in the hinge toothing or on gaps between the door and the shell of the aircraft body. By using the flexible covering according to the present invention, these openings are closed or covered, whereby the aerodynamics are improved and as a result, the fuel consumption and weight are reduced. In addition, advantageously, both with an opened or closed aircraft door (upon use of the covering device with an aircraft door), rainwater cannot penetrate. Thus, in an advantageous manner, the provision of aluminum profiles as rain protection is obsolete, whereby weight and costs can be saved.

In addition, the covering device advantageously makes possible the protection of the hinge from external effects, whereby under certain circumstances, a reduction in maintenance expenses can be achieved. Furthermore, the covering device according to this embodiment enables a very simple design and a simple construction, since no additional closing mechanism is required. The function of the covering is achieved alone via the closing angle of the hinge.

According to an advantageous exemplary embodiment of the present invention, as provided in claim 2, the flexible covering is a sheet. This makes possible a simple and cost-efficient realization of the covering device.

According to a further advantageous exemplary embodiment of the present invention, the flexible covering is an elastomer material. In an advantageous manner, this makes possible a cost-efficient, simple, and durable realization.

According to a further advantageous exemplary embodiment of the present invention, the flexible covering has a contour, for example in the edge regions, for engagement with a corresponding contour on the corresponding hinge part. In this manner, a simple attachment of the covering device on the hinge parts may be ensured.

According to a further advantageous exemplary embodiment of the covering device of the present invention, as provided in claim 5, the flexible covering has a thickening, which can be guided into a corresponding constriction of a hinge part, so that the flexible covering is held in the hinge part.

According to a further advantageous exemplary embodiment of the present invention, as provided in claim 6, the flexible covering is provided with at least one lashing strap, which is formed for attaching the flexible covering to a hinge part. In an advantageous manner, this makes possible a secure attachment of the flexible covering. In particular, this makes possible attachment of the flexible covering to a side of the hinge axis, which is opposite to an other side of the hinge axis on which the flexible covering is arranged.

According to a further advantageous embodiment of the present invention, as provided in claim 7, a hinge for a door of an aircraft is provided, wherein the hinge has a flexible covering, which in a position of the hinge, for example when the hinge is closed, is stretched over the outer contour of the hinge.

In an advantageous manner, a hinge for a door of an aircraft can be provided, which makes possible improved aerodynamics and lower weight of the aircraft.

Further advantageous embodiments of a hinge of the present invention are provided in claims 8 through 12.

According to a further advantageous exemplary embodiment of the present invention, as provided in claim 13, the hinge is a part of an aircraft door, for example of a cargo door of an cargo aircraft. However, it should be noted that the hinge of the present invention also can be provided on the hatches or portholes of the aircraft. Also, a use of the hinge of the present invention in the motor vehicle industry, for example, is possible.

Advantageous embodiments of the present invention are described next with reference to the accompanying figures. In the figures:

BRIEF DESCRIPTION OF THE DRAWINGS

In the following description of FIGS. 1 through 12, the same or corresponding elements are designated with the same reference signs.

DESCRIPTION OF A PREFERRED EMBODIMENT

Figure 1:
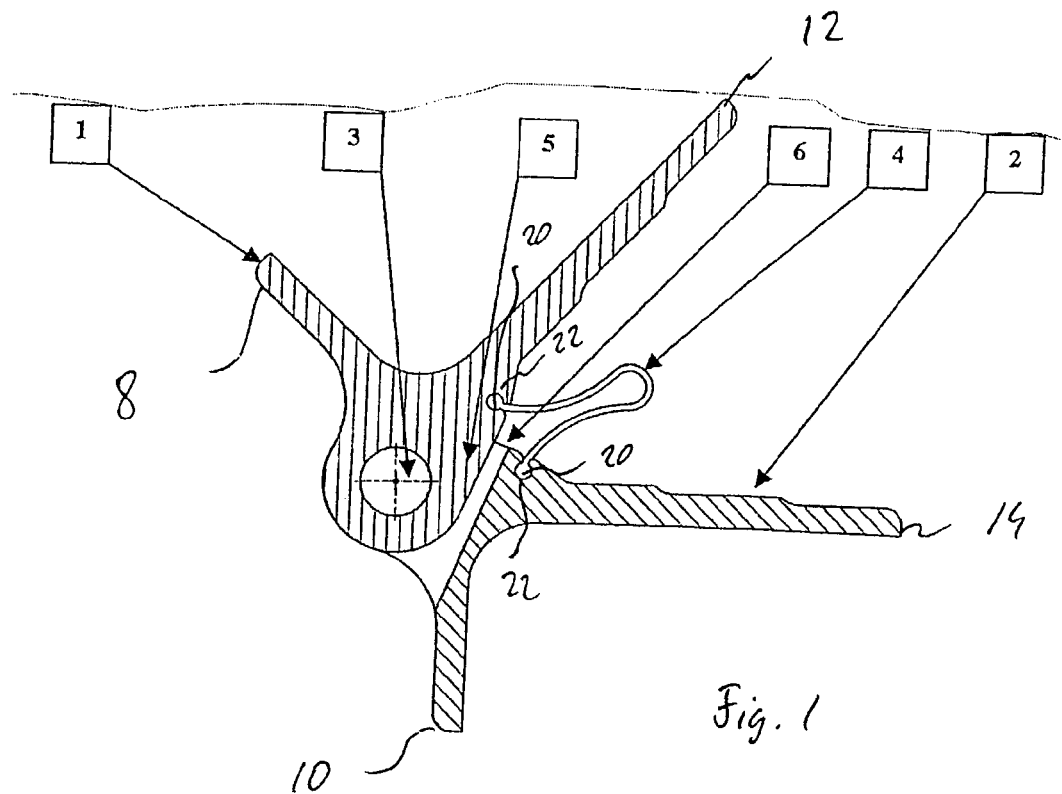
FIG. 1 shows a sectional view through an example of a hinge according to the present invention in the opened state.

FIG. 1 shows a sectional view of an embodiment of a hinge according to the present invention in an opened state with a covering device according to an exemplary embodiment of the present invention.

Figure 2:
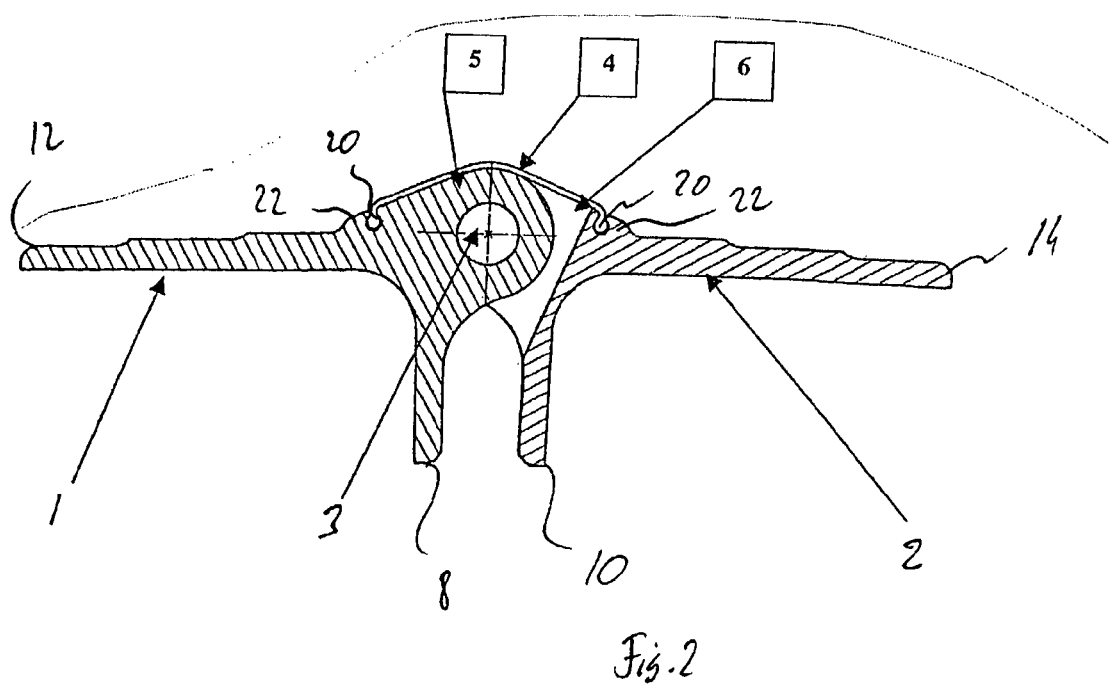
FIG. 2 shows a sectional view through the hinge of FIG. 1 in the closed state.

Reference sign 1 in FIG. 1 designates a first hinge part, which is connected by means of a hinge axis 3 with a second hinge part 2, such that both or also only one of the first and second hinge parts 1, 2 can effect a rotational movement about the hinge axis 3. In each case, at least one of the first and second hinge parts 1, 2 can be rotated about the hinge axis 3, such that the hinge can be displaced between the opened state, which is shown in FIG. 1, and the closed state, which is shown in FIG. 2.

Reference sign 4 designates the flexible covering. The flexible covering 4, which for example can be a plastic film or can be made from an elastomer material, has a thickening 20 in one region. In a further region, the flexible covering 4 likewise has a thickening 20. The thickenings 20 are arranged in corresponding receivers 22 in the first hinge part 1 and the second hinge part 2.

As shown in FIG. 1, the hinge in the opened state has a gap 6, which, when the flexible covering 4 is not there, can be penetrated for example by rainwater. The reference signs 12 and 14 in FIG. 1 designate a first and a second profile of the hinge. The reference sign 8 designates a first projection of the first hinge part 1 and the reference sign 10 designates a second projection of the second hinge part 2. As shown in FIG. 1, the hinge parts 1, 2 have a substantially L-shaped form, wherein a corner of the L is provided as a region for receiving the hinge axis 3.

As likewise can be seen from FIG. 1, the flexible covering 4 in an unstretched position has a dimension, which is greater than the spacing of the two receivers 22, when the hinge is in the opened state. Therefore, the covering does arch outwardly, as can be seen in FIG. 1. Since, however, the gap 6 is still covered by the flexible covering 4, for example the penetration of rainwater into the gap 6 can be prevented. Preferably, the flexible covering 4 is provided on the side of the hinge facing outward. For example, when the hinge is arranged on an aircraft door, the flexible covering 4 is arranged on the outer side of the aircraft body.

FIG. 2 shows a sectional view of the hinge of FIG. 1 in the closed state. As shown in FIG. 2, the flexible covering 4 stretches in the closed state over the outer contour of a region of the hinge. In this connection, it should be noted that the outer contour does not relate to the entire outer contour of the hinge, rather concerns a section or a region of the outer contour of the hinge. In particular, FIG. 2 shows that the region of the hinge, in which the hinge axis 3 is provided, is covered by the flexible covering 4. In particular, the gap 6 between the first hinge part and the second hinge part is covered.

In an advantageous manner, a dimension of the path between the receivers 22 over the outer contour of the hinge in the closed state is greater than the corresponding extension of the flexible covering 4 in an unstretched state. In this manner, it is obtained that the flexible covering 4 is stretched over the contour of the hinge housing and rests firmly on the hinge housing. In an advantageous manner, the flexible covering 4 protects the hinge and in particular the moveable parts of the hinge from external effects, which can reduce the maintenance expense of the hinge. In addition, as shown in FIG. 2, a closed hinge outer surface can be achieved, whereby the aerodynamics of the hinge can be improved.

A comparison of FIGS. 1 and 2 provides in a simple manner the functional manner of the covering device according to the present invention, namely, in particular the flexible covering 4. If the hinge is in the opened state (FIG. 1), the flexibility of the flexible covering 4 makes possible that the flexible covering arches. If the hinge is closed, the flexible covering 4 is stretched over a region of the outer contour of the hinge, whereby a gap 6 can be closed and whereby the aerodynamics of the hinge can be improved, in that air turbulence, which would exist on the gaps 6, cannot exist.

Figure 3:
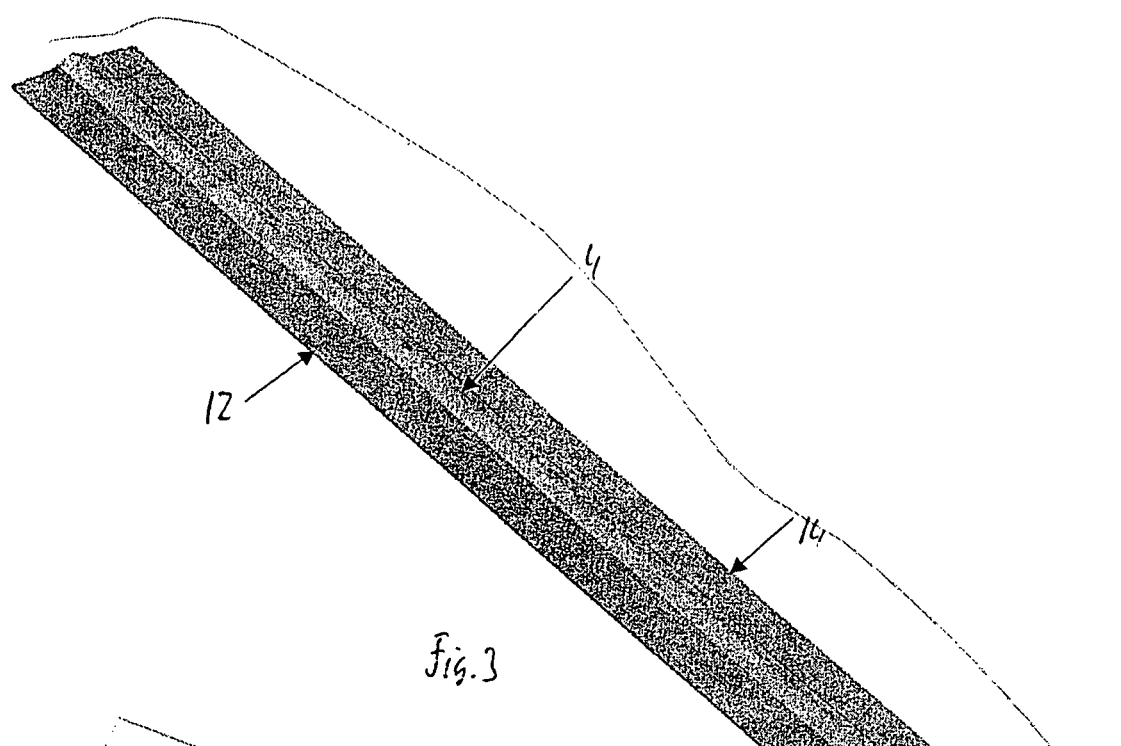
FIG. 3 shows a three-dimensional view of a further embodiment of a hinge according to the present invention.

FIG. 3 shows a three-dimensional view of an embodiment of a hinge in the closed state. As FIG. 3 shows, the primary axes of the profile 12 and 14 are substantially parallel. The flexible covering, which merely forms a small bulge, is between the profiles 12 and 14. However, between the profile 12 and the profile 14, a smooth transition is existent, which counteracts an airflow with only a little resistance and only produces a small amount of turbulence.

Figure 4:
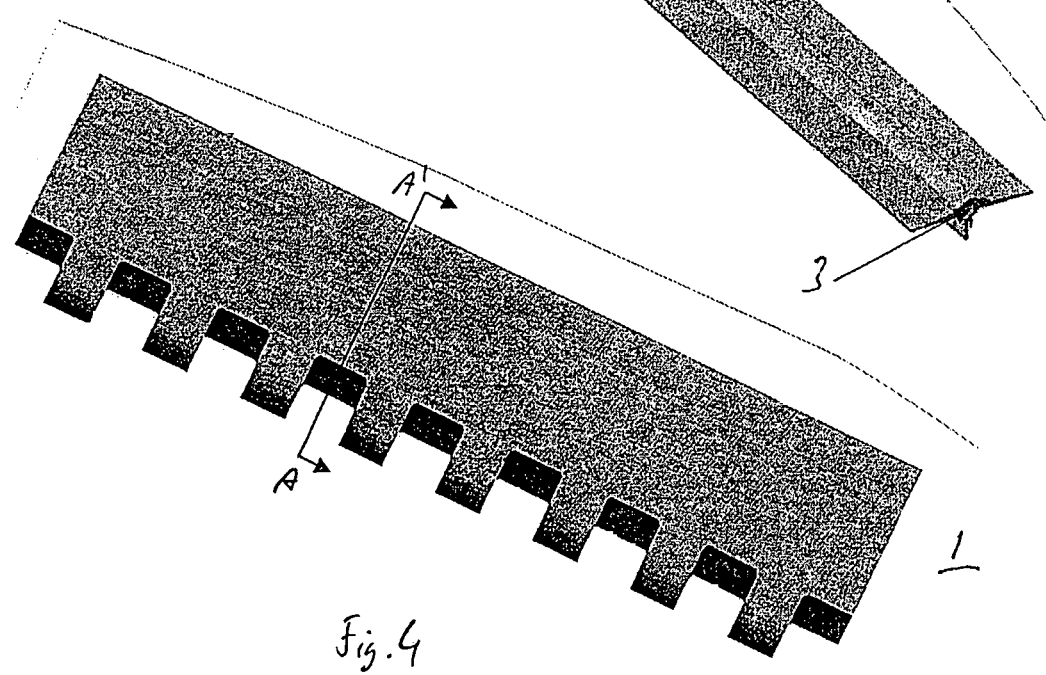
FIG. 4 shows a three-dimensional view of a hinge part according to an embodiment of the present invention.

FIG. 4 shows a plan view of a hinge part according to an embodiment of the present invention. In particular, FIG. 4 provides that with the hinge of this embodiment, as with a piano hinge, each strap hinge alternatively has a tooth along the hinge axis. If the first hinge half, as shown in FIG. 4, is combined with the corresponding second hinge half, then the teeth engage in one another.

Figure 7:
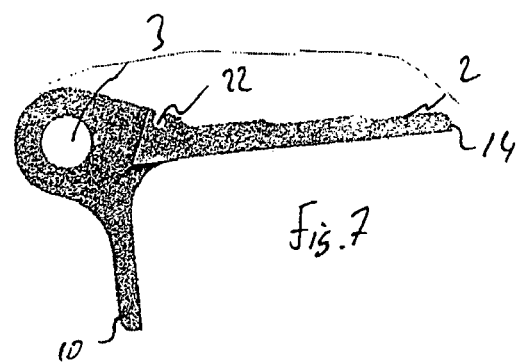
FIG. 7 shows a plan view of an embodiment of a hinge part of the hinge of FIG. 5.
Figures 8, 9, 10:
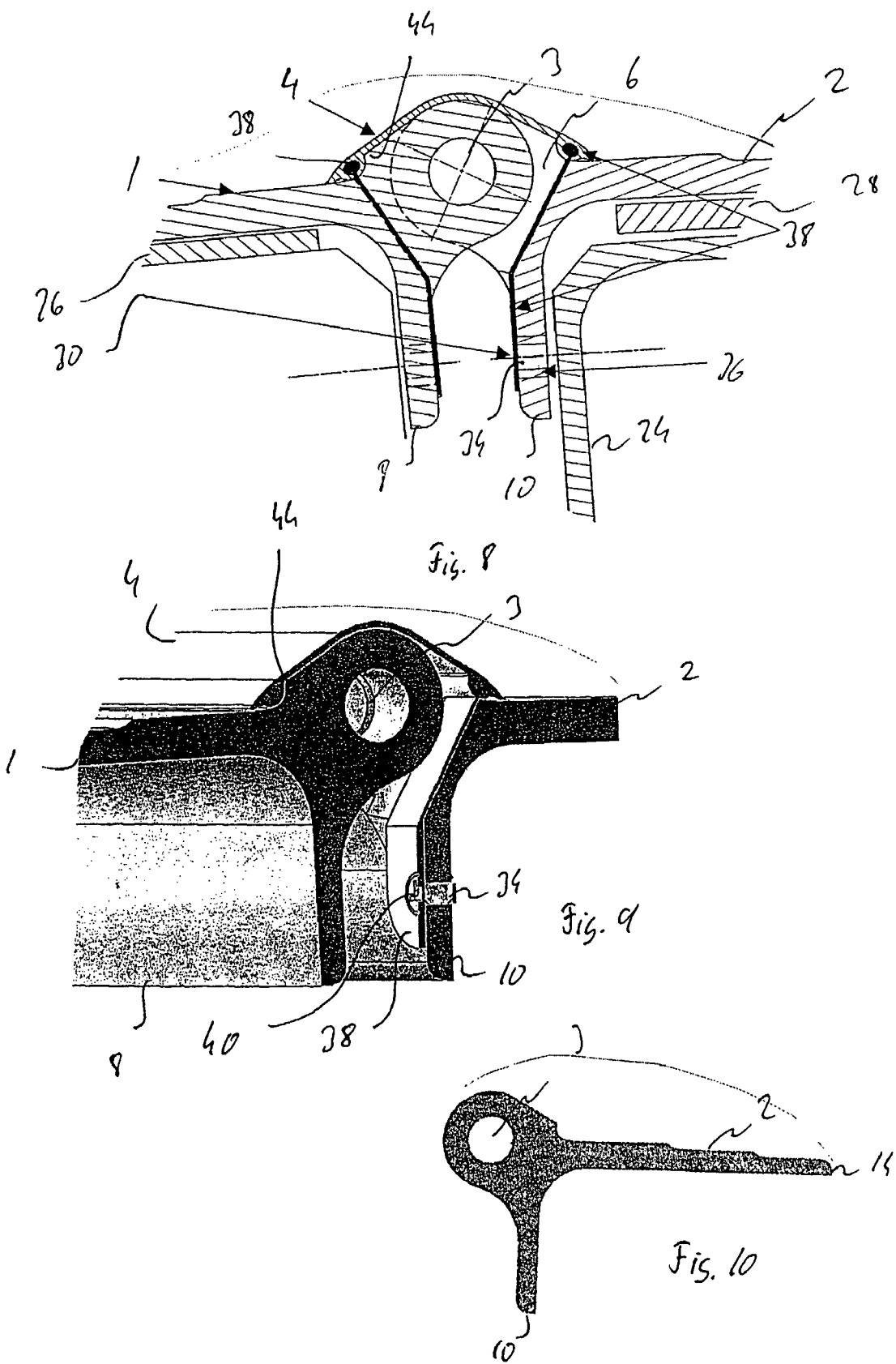
FIG. 8 shows a sectional view of a further embodiment of a hinge according to the present invention in the closed state.
FIG. 9 shows a three-dimensional view of the hinge of FIG. 8.
FIG. 10 shows a plan view of an embodiment of a side part of the hinge of FIG. 8.

The advantageous exemplary embodiments of the present invention described with reference to FIGS. 5 through 12, respectively has a structure similar to the plan view of FIG. 4. In FIGS. 7, 10 and 12, respective sectional views of the corresponding hinge parts are shown, which correspond to corresponding cuttings along the section boundary AA', as indicated in FIG. 4.

Figure 5:
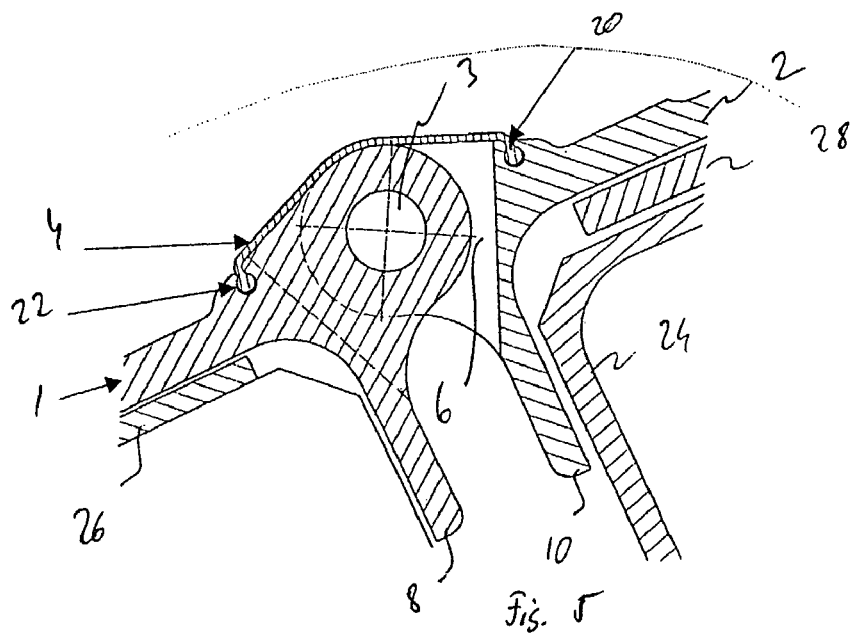
FIG. 5 shows a sectional view of a further embodiment of a hinge according to the present invention in a closed state.

FIG. 5 shows a sectional view of a further exemplary embodiment of a hinge according to the present invention. The reference sign 24 in FIG. 5 designates an aircraft structure. The reference sign 26 in FIG. 5 designates a structure of a door, for example an aircraft door, and reference sign 28 designates by way of example the shell of an aircraft. Thus, as shown in FIG. 5, the hinge is arranged between the aircraft door and the shell of the aircraft and can be connected with the aircraft structure 24, for example a reinforced structure in the aircraft body.

Figure 6:
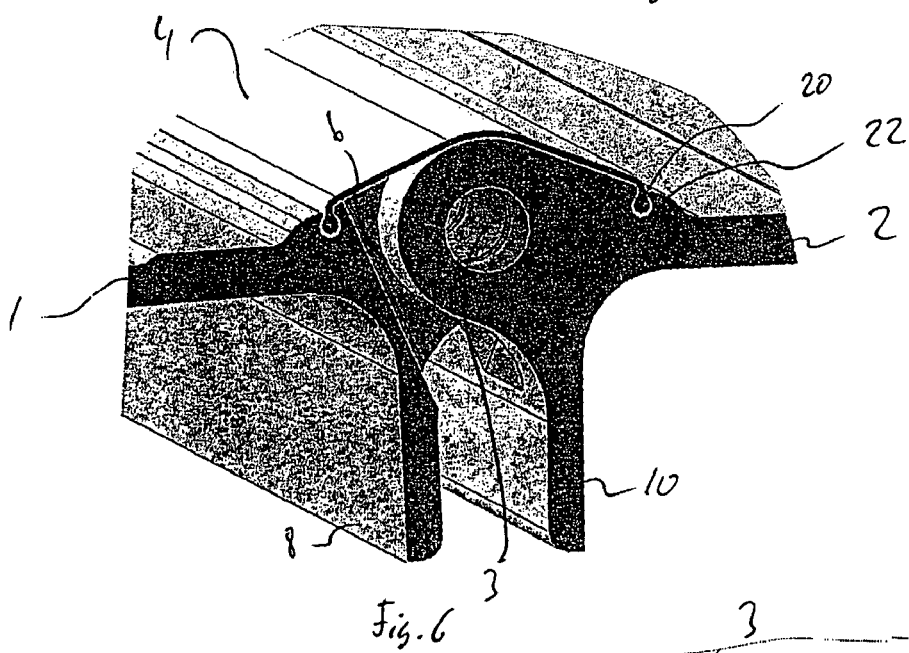
FIG. 6 shows a three-dimensional view of the hinge of FIG. 5.

FIG. 6 shows a three-dimensional view of the hinge of FIG. 5. As can be seen in FIG. 6, the flexible covering 4 extends substantially parallel to the hinge axis 3. The hinge parts 1 and 2, respectively, have a thickening, in which the receivers 22 for the thickenings 20 of the flexible covering are arranged. The receivers 22 have an substantially round cross section, with a recess that is smaller than the diameter of the receiver 22. In this manner, the thickening 30 can be threaded into the receiver 22. This makes possible a simple and secure holding of the flexible covering 4 on the first and second hinge part.

FIG. 7 shows a sectional view through the second hinge part 2 of the embodiment shown in FIG. 5. As can be seen in FIG. 7, the second hinge part 2 has a substantially L-shaped form, wherein on the corner of the L, a receiver for the hinge axis 3 is provided. The short leg of the L is formed by a projection 10, the long leg of the L by the profile 14, which can have a stepped, reduced thickness, as can be seen in FIG. 7.

FIG. 8 shows a sectional view of a further advantageous exemplary embodiment of the hinge according to the present invention. As can be seen in FIG. 8, the flexible covering 4 is mounted by means of two lashing straps into the tooth gaps of the respective hinge parts 1 and 2. The lashing straps 38, for example, can be fused into the flexible covering 4. In each case, the lashing straps 38 are attached on the side regions of the flexible covering 4. For example, the ends of the lashing straps 38 can be designed as thickenings, which are arranged in corresponding receivers in the flexible covering 4. The other ends of the lashing straps extend respectively through the corresponding gaps 6 to the corresponding first or second projection 8 or 10.

The projections 8 and 10 each can be provided with a corresponding threading 36. In this manner, the corresponding lashing belt 38 can be screwed by means of a screw to the corresponding projection 8, 10.

In an advantageous manner, shoulders 44 are formed on the first and second hinge parts, whereby correspondingly formed side regions of the flexible covering are respectively held in position. In an advantageous manner, this attachment of the flexible covering makes possible holding from behind. This means that the flexible covering 4, which is arranged on one side of the hinge axis 3, is attached by means of the lashing belt 38 to the projections 8 and 10 on an opposite side of the hinge axis 3. Advantageously, for example, mounting from the interior can be made possible.

FIG. 9 shows a three-dimensional view of the hinge of FIG. 8, whereby the lashing strap 38 is screwed by means of a screw into the threading 36 of the bore 34.

FIG. 10 shows a sectional view of the second hinge part 2 of the hinge of FIG. 8.

Figure 11:
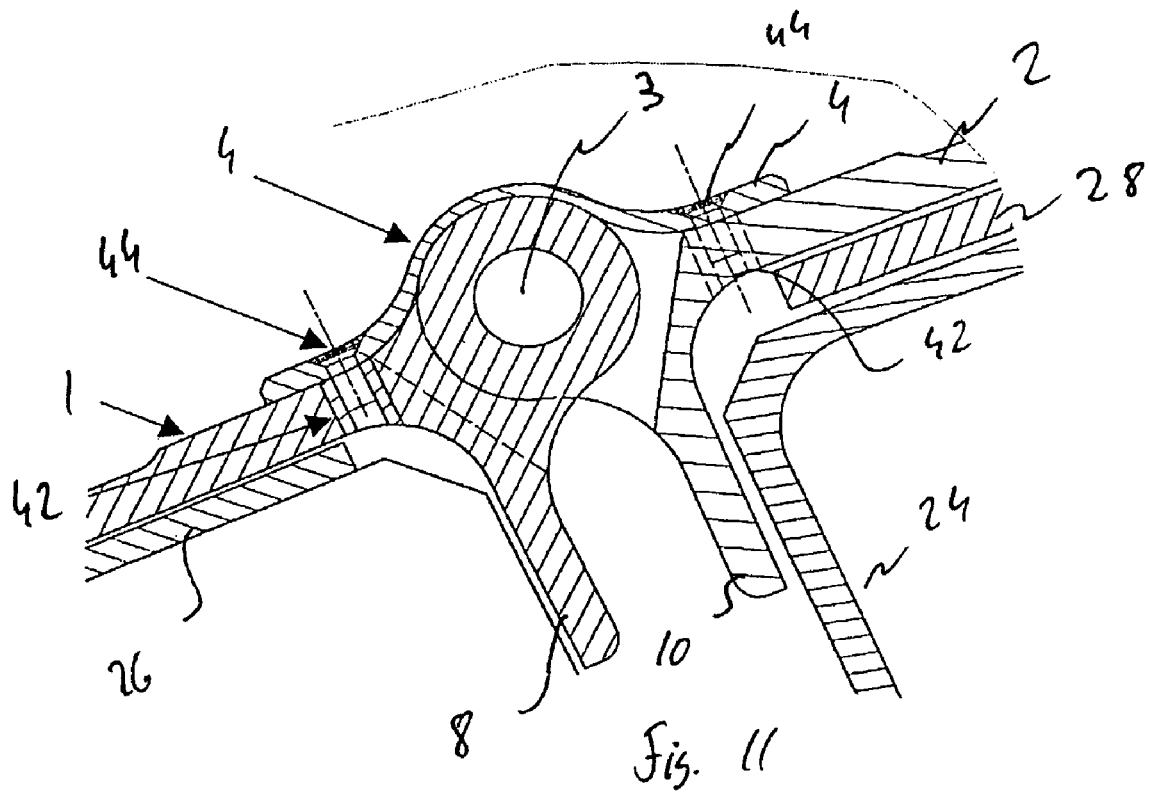
FIG. 11 shows a sectional view of a further embodiment of a hinge according to the present invention in a closed state.
Figure 12:
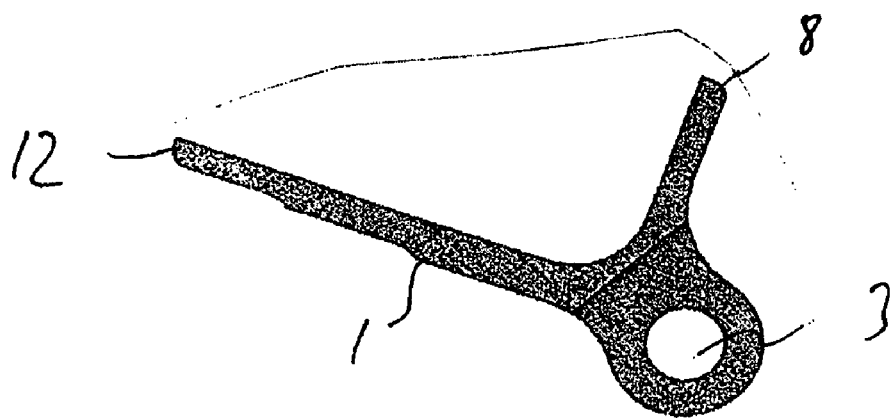
FIG. 12 shows a plan view of an embodiment of a hinge part of the hinge of FIG. 11.

FIG. 11 shows a sectional view of a further exemplary embodiment of the hinge according to the present invention. In the exemplary embodiment shown in FIG. 11, the first hinge part 1 and the second hinge part 2 have bores with threading. These bores are designated with reference sign 42. The covering 4 is screwed by means of screws 44 with the corresponding hinge parts on both sides of the hinge.

FIG. 12 shows a sectional view of the first side part of FIG. 11. The exemplary embodiment of the present invention shown in FIGS. 11 and 12 makes possible a simple, also subsequent mounting of the flexible covering. Indeed, small turbulences are generated in the gaps for the screws, which in particular compared with the embodiments shown in FIGS. 1 through 10, effect a slightly impaired aerodynamic.

In addition, it should be noted that "comprising" does not exclude other elements or steps and "a" or "an" does not exclude a plurality. In addition, it should be noted that features or steps, which have been described with reference to one of the above described exemplary embodiments, also can be used in combination with other features or steps of other exemplary embodiments described above. Reference signs in the claims are not to be viewed as limitations.

The invention claimed is:

1. Covering device for a hinge for an aircraft, the hinge having an outer contour, a first hinge part and a second hinge part, the first hinge part being displaceable relative to the second hinge part between a first position and a second position, the covering device comprising:
   a flexible covering including
      a first region mountable on the first hinge part; and
      a second region mountable on the second hinge part;
   the flexible covering being configured such that when the first hinge part is positioned in the second position, the flexible covering is in an unstretched condition and has a first dimension between the first and second region, the flexible covering being further configured such that, when the first hinge part is positioned in the first position, the flexible covering is stretched over the outer contour of the hinge and has a second dimension between the first region and the second region, the second dimension being greater than the first dimension;
   a projection extending from at least one of the first and second hinge part in a direction away from the flexible covering; and
   at least one lashing strap attaching the flexible covering to the projection by extending from the flexible covering to the projection.

2. Covering device according to claim 1, wherein the flexible covering is a sheet.

3. Covering device according to claim 1, wherein the flexible covering is made from an elastomer material.

4. Covering device according to claim 1, wherein the first region or the second region of the flexible covering comprises a first contour, for engagement with a corresponding second contour on the first hinge part or the second hinge part;
   wherein the first contour is operable to hold at least a fraction of a tractive force in cooperation with the second contour, the tractive force arising from an expansion of the flexible covering when the hinge is in the first position.

5. Covering device according to claim 1, wherein the portion of the outer contour of the hinge over which the flexible covering is stretched is a sealed region.

6. Covering device according to claim 1, wherein the first and the second hinge part are mountable at an outside of the aircraft.

7. Hinge for a door of an aircraft, the hinge comprising:
a first hinge part;
a second hinge part, the first hinge part being displaceable relative to the second hinge part between a first position and a second position;
an outer contour;
a flexible covering including a first region attached to the first hinge part, the flexible covering further including a second region attached to the second hinge part, the flexible covering being configured such that when the first hinge part is positioned in the second position, the flexible covering is in an unstretched condition and has a first dimension between the first and second region, the flexible covering being further configured such that, when the first hinge part is positioned in the first position, the flexible covering is stretched over a portion of the outer contour of the hinge and has a second dimension between the first region and the second region, the second dimension being greater than the first dimension;
a projection extending from at least one of the first and second hinge part in a direction away from the flexible covering; and
at least one lashing strap attaching the flexible covering to the projection by extending from the flexible covering to the projection.

8. Hinge according to claim 7,
wherein the first region or the second region of the flexible covering has a first contour for engagement with a corresponding second contour on the first hinge part or the second hinge part;
wherein the first contour is operable to hold at least a fraction of a tractive force in cooperation with the second contour, the tractive force arising from expansion of the flexible covering when the hinge is in the first position.

9. Hinge according to claim 7,
wherein the flexible covering is a sheet.

10. Hinge according to claim 7,
wherein the flexible covering is made from an elastomer material.

11. Hinge according to claim 7,
wherein the hinge is part of an aircraft door.

\* \* \* \* \*